United States Patent [19]

Pater

[11] Patent Number: 5,338,806
[45] Date of Patent: Aug. 16, 1994

[54] TOUGH, PROCESSABLE SIMULTANEOUS SEMI-INTERPENETRATING POLYIMIDES

[75] Inventor: Ruth H. Pater, Tabb, Va.

[73] Assignee: The United States of America as represented by the Administrator of the National Aeronautics and Space Administration, Washington, D.C.

[21] Appl. No.: 829,792

[22] Filed: Jan. 31, 1992

Related U.S. Application Data

[63] Continuation-in-part of Ser. No. 430,470, Nov. 2, 1989, abandoned.

[51] Int. Cl.⁵ ............................ C08J 5/08; C08K 3/04
[52] U.S. Cl. .................................... 525/421; 525/432; 525/436; 525/903
[58] Field of Search ................ 525/432, 436, 903, 421

[56] References Cited

U.S. PATENT DOCUMENTS

| | | | |
|---|---|---|---|
| 4,954,578 | 9/1990 | Ree et al. | 525/432 |
| 4,996,101 | 2/1991 | Landis et al. | 528/272 |
| 5,145,916 | 9/1992 | Yamamoto et al. | 525/421 |
| 5,149,746 | 9/1992 | Pater | 525/422 |
| 5,159,029 | 10/1992 | Pater et al. | 525/421 |

*Primary Examiner*—Ana L. Carrillo
*Attorney, Agent, or Firm*—George F. Helfrich; Joy L. Bryant

[57] ABSTRACT

A high temperature semi-interpenetrating polymer network (semi-IPN) was developed which had significantly improved processability, damage tolerance and mechanical performance, when compared to the commercial Thermid® materials. This simultaneous semi-IPN was prepared by mixing a thermosetting polyimide with a thermoplastic monomer precursor solution (NR-150B2) and allowing them to react upon heating. This reaction occurs at a rate which decreases the flow and broadens the processing window. Upon heating at a higher temperature, there is an increase in flow. Because of the improved flow properties, broadened processing window and enhanced toughness, high strength polymer matrix composites, adhesives and molded articles can now be prepared from the acetylene endcapped polyimides which were previously inherently brittle and difficult to process.

9 Claims, 3 Drawing Sheets

FIG. I

TOUGH, PROCESSABLE SIMULTANEOUS SEMI-INTERPENETRATING POLYIMIDES

ORIGIN OF THE INVENTION

The invention described herein was made by an employee of the United States Government and may be manufactured and used by or for the Government for governmental purposes without the payment of any royalties thereon or therefor.

CROSS-REFERENCE

This application is a continuation-in-part of co-pending application Ser. No. 430,470, filed Nov. 2, 1989, now abandoned and is related to co-pending patent applications Ser. No. 429,514, filed Oct. 31, 1989 now U.S. Pat. No. 5,159,029, entitled A Tough High Performance Composite Matrix, and Ser. No. 301,925, filed Jan. 26, 1989 now U.S. Pat. No. 5,149,746, entitled Semi-interpenetrating Polymer Network for Tougher and More Microcracking Resistant High Temperature Polymers.

Background of the Invention

1. Field of Invention

The present invention relates generally to high temperature polymers. It relates particularly to a semi-interpenetrating polymer network approach to the obtainment of more processable, tougher and more moisture resistant high temperature polymers. The systems are particularly adapted to use as moldings, adhesives and composite matrices.

2. Description of the Related Art

There is a continual search in the art for more processable and damage tolerant high temperature polymers for use as moldings, adhesives and composite matrices in aerospace and electronic technologies. Materials used in these environments must have a variety of desired properties including easy processing, good damage tolerance, a high glass transition temperature, good mechanical performance, capable of withstanding high temperature, low moisture absorption, and resistance to a variety of organic solvents. Although polymers exist that exhibit one or more of the above properties, these materials are generally deficient in at least one other desired property.

One example of such material is the thermoplastic polyimide, NR-150B2, which is commercially available from E. I. Dupont de Nemours and Company (Dupont). This material is well known for its good toughness and microcracking resistance. In addition, it has unusually high thermo-oxidative stability. Unfortunately, it is difficult to process and it requires processing temperatures as high as 400° C.

Another example includes the commercially available Thermid ® materials, which are commercially available from the National Starch and Chemical Corporation. These materials are acetylene-endcapped polyimides. They offer outstanding thermo-oxidative stability, exceptional dielectric properties and excellent resistance to humidity at elevated temperature. However, these materials are inherently brittle due to their highly crosslinked structures and are liable to microcrack in their composites when subjected to thermal cycling. Also, despite having the advantage of addition-curing, they are actually very difficult to process. This is primarily due to their very narrow processing window. Thermid ® MC-600, for example, has a gel time of three minutes at 190° C. (A. L. Landis and A. B. Naselow, NASA Conference Publication 2385 (1985)). The problem becomes exacerbated in composite fabrication, particularly in large and/or complex composite parts. Because of the processing difficulty, the composite property values for Thermid ® MC-600 are lower than expected. The National Starch and Chemical Corporation product data sheet number 26283 reports the values of 195 and 148 ksi for the unidirectional flexural strengths tested at 25° C. and 316° C., respectively, and interlaminar shear strengths of 12 and 8 ksi at 25° C. and 316° C., respectively. The desired values are 250 and 150 ksi for the 25° C. and 316° C. flexural strengths and 14 and 8 ksi for the 25° C. and 316° C. interlaminar shear strengths.

This processing problem was well recognized in the early stages of the material's development. Several approaches have been attempted to improve the processability of Thermid ® MC-600. The first approach was to incorporate difunctional or monofunctional acetylene-terminated reactive diluents into the material (A. L. Landis and A. B. Naselow NASA Conference Publication 2385 (1985)). This approach had limited success due to the lack of a common solubility between the preimidized oligomer and the diluent.

Grimes and Reinhart (U.S. Pat. No. 4,365,034) took another approach, recognizing that the processing problem was related to the fast cure rate of the acetylene-terminated material. They added a chemical inhibitor to retard the rate of cure so that the oligomer remains in the fluid state for an extended period of time thereby increasing the processing window. Some examples of this inhibitor include hydroquinone, maleic acid, glutaric acid, or bis($\beta$-naphthyl)para-phenylene diamine. However, whether such an approach indeed facilitates the fabrication of high quality composite materials was not demonstrated.

To improve the resin flow, Landis and Naselow (NASA Conference Publication 2385 (1985)) developed an isoimide version of Thermid ® MC-600, which is now known as Thermid ® IP-600. Despite the markedly improved resin flow, the resulting composite showed relatively low levels of mechanical properties (unidirectional flexural strengths of 130 and 78 ksi at 25° C. and 288° C. and interlaminar shear strengths of 7 and 5 ksi at 25° C. and 288° C., respectively).

Recently, Landis and Lau (U.S. Pat. No. 4,996,101) extended the isoimide modification concept to the development of a semi-interpenetrating polymer network (semi-IPN). They prepared a sequential semi-2-IPN by combining a thermoplastic polyisoimide with a thermosetting imide or isoimide oligomer which contains an acetylene-terminated group. They assert that the isoimide modification can, by theory, improve the composite processing and thereby produce better quality composite materials that the present state-of-the-art materials. Unfortunately, they did not demonstrate the improved composite properties for these semi-2-IPNs. The absence of a showing of the composite mechanical properties makes the utility of this technology questionable. It is doubtful that the isoimide modification can, in practice, significantly improve the processability. The reason is as follows: the isoimide undergoes an isoimideimide isomerization. This isomerization reaction induces a melt-flow transition which is responsible for the improved resin flow. However, the isomerization reaction takes place rapidly and occurs at a relatively low temperature. Thermid ® IP-600, for example, shows a sharp melt-flow transition peak at 148° C. in the Rheometrics ® rheology-temperature curve. This is illustrated in FIG. 1. This transition is due to the isoimide-imide isomerization. This interpretation is supported by the appearance of another transition peak occurring at 188° C. due to the melt-flow of the imide formed from the isoimide. Thermid ® MC-600 has the same transition peak at 188° C. The cure temperature for Thermid ® based composites is usually 250° C. At this critical cure temperature, Thermid ® IP-600 has these prior art products have the desired combination of properties set forth herein above.

It is believed that the processing difficulty of the Thermid ® materials is directly related to the fundamental nature of the curing chemistry. According to the proposed cure mechanism (Goldfarb, Lee, Arnold, and Helminiak, NASA Conference Publication 2385 (1985)) the curing of an acetylene-terminated oligomer proceeds stepwise and can be broadly divided into two distinct stages. The reaction sequence is shown by the following reaction scheme.

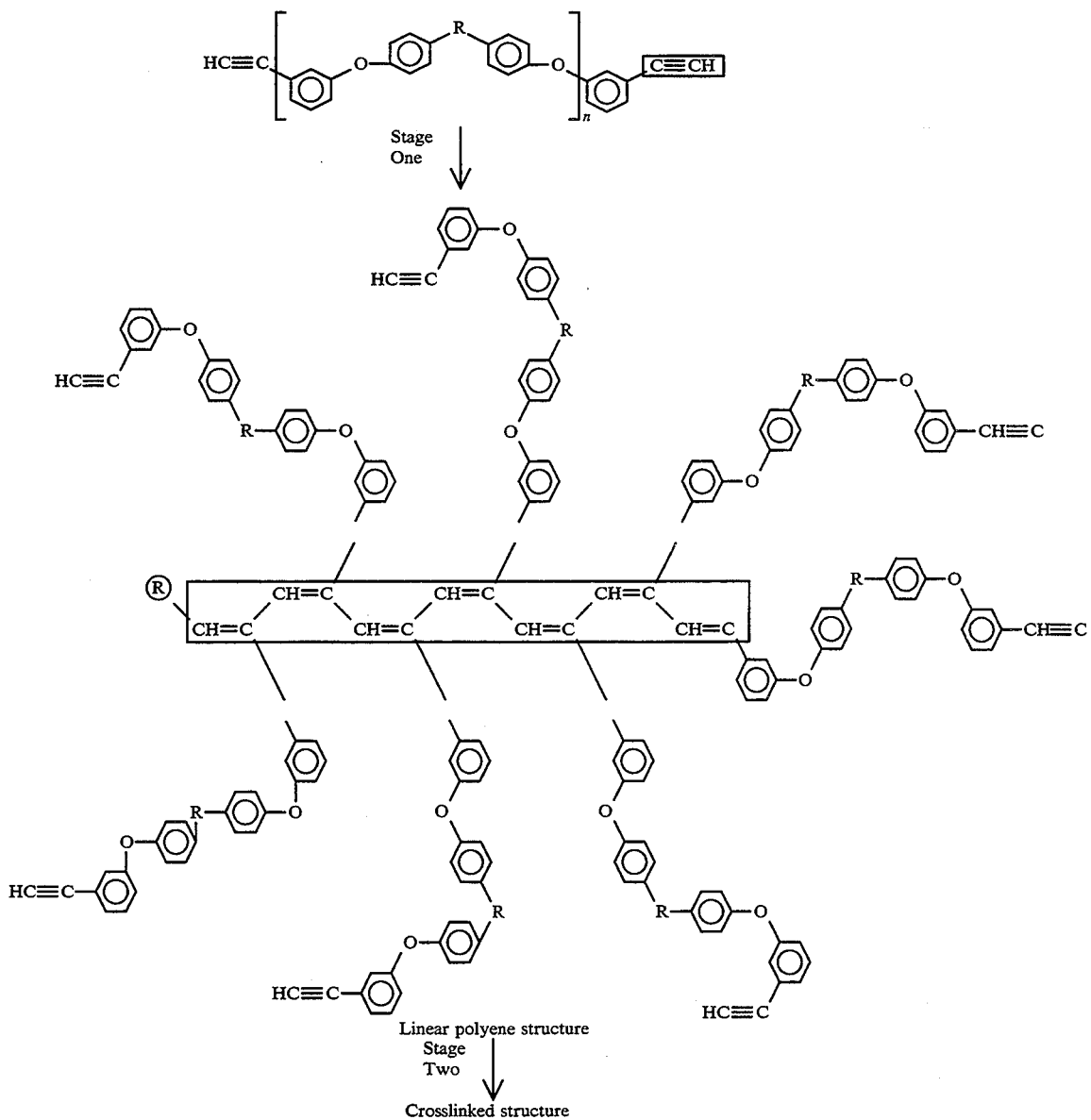

already gelled, the gel temperature being 220° C. Thus, the enhanced flow resulting from the isoimide modification will not significantly affect the composite fabrication. This may explain why low values were obtained for the composite mechanical properties formed from Thermid ® IP-600.

Egli and St. Clair (U.S. Pat. No. 4,695,610) have also prepared chemically compatible semi-2-IPNs from thermoplastic polyimide sulfones and thermosetting acetylene-endcapped polyimide sulfones. However, none of In stage one, the reaction site is an acetylene-terminated group, which is marked in the rectangular area at the top of the reaction equation. This reacting group is relatively sterically unhindered and is ready to react with another acetylene-terminated group of a different molecule. The addition reaction occurs very rapidly via a free radical mechanism. In a very short period of time, six to seven molecules are added to form a cluster, which has six to seven arms and a conjugated polyene moiety embedded in the center of the cluster. At this stage, the material is in the solid state. The reaction essentially stops until a higher curing temperature is applied.

The fast reaction rate of the stage one reaction is responsible for the narrow processing window of an acetylene-terminated oligomer. This entraps any residual solvent and air. As a result, the cured neat resin, composite, and adhesive joint contain voids and cracks which result in poor mechanical performance.

Another important factor contributing to the poor mechanical performance, particularly elevated temperature mechanical properties, is a lack of high degree of crosslinking. The crosslinking reaction occurs in stage two. The reacting group is the conjugated polyene marked in the rectangular area in the middle of the reaction scheme. Since this reaction site is buried in the center of a cluster, it is extremely difficult sterically for the polyene to interact with another molecule of the polyene. Consequently, a very high processing temperature is required to effect the crosslinking reaction.

The novelty of the present invention lies in the concept that if stage one of the reaction is slowed down and stage two is accelerated, a well-consolidated composite will result. The semi-IPN reaction system of the present invention is designed to exploit this concept.

An object of the present invention is to prepare a tough, processable semi-IPN from a thermosetting and a thermoplastic polyimide. The semi-IPN reaction system is so designed to undergo chain extension below 300° C., whereby the flow and the reaction rate are decreased and the processing window is broadened and, upon heating above 300° C., the flow is increased and crosslinking occurs at a rate which allows for the formation of a void-free polymer network.

Another object of the present invention is to form a simultaneous semi-interpenetrating network from a thermosetting polyimide and a thermoplastic monomer precursor solution.

Another object of the present invention is to improve the processing of the Thermid ® materials.

Another object of the present invention is to improve the processing of NR150-B2.

Another object of the present invention is to prepare molding compounds, adhesives, and polymer matrix composites from the semi-interpenetrating network.

SUMMARY OF THE INVENTION

A high temperature semi-interpenetrating polymer network (semi-IPN) was developed which had significantly improved processability, damage tolerance, and mechanical performance, when compared to the unmodified acetylene-endcapped polyimides known commercially as Thermid ®. The improved processability is attributed in part to the broadening of the processing window and enhanced resin flow at the critical processing temperatures above 300° C. This was accomplished by a two step process. In the first step, the monomers slowly underwent linear chain extension. This reaction was slow enough to allow the volatiles from the solvent and the reaction to escape. In the second step, the resins were heated above 300° C., causing an increase in molecular mobility which allows for the formation of a composite having improved damage tolerance and mechanical properties. For example, the fracture energy for the semi-IPN was 603 $J/m^2$ as compared to 93 $J/m^2$ for Thermid ® LR-600.

The simultaneous semi-IPN was prepared by mixing a thermosetting polyimide with a thermoplastic polyimide monomer precursor solution. In the present invention, the thermosetting polyimide was selected from the Thermid ® series, which is commercially available from the National Starch and Chemical Corporation. The thermoplastic polyimide precursor solution is commercially available from E.I. Dupont de Nemours and Company (Dupont), under the name NR-150B2.

These semi-IPNs are useful as molding compounds, adhesives, and polymer matrix composites for the electronics and aerospace industries.

DESCRIPTION OF THE PREFERRED EMBODIMENTS

Figure 1:
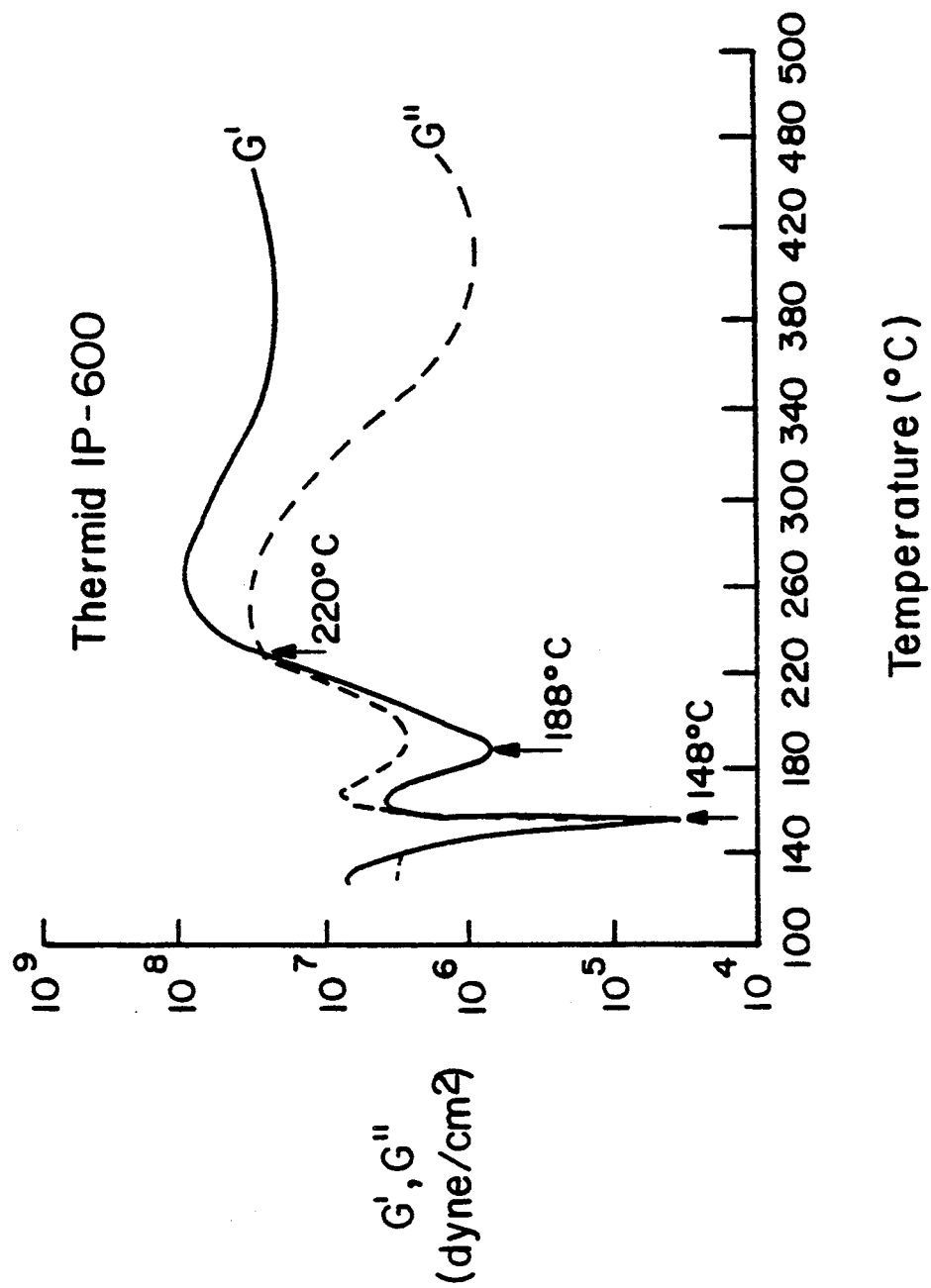
FIG. 1 shows storage modulus (G') and loss modulus (G") temperature curves for the commercially obtained Thermid ® IP-600 as conducted by the inventor for illustrative purposes.

In high performance semi-IPN synthesis, one or more easy-to-process, but brittle thermosetting polyimides are combined with one or more tough, but difficult-to-process linear thermoplastic polyimides to form a semi-IPN polyimide which has a combination of several desirable properties. These properties include easy processability, damage tolerance, good mechanical performance, and good thermo-oxidative stability. This is achieved by controlling factors such as: (1) selection of constituent polymer components; (2) composition variation of the constituent materials; and (3) processing parameters.

The selection of the constituent thermosetting and thermoplastic polyimides is based primarily on their processing and property compatibility. Of particular importance are solubility in a common organic solvent and compatible cure cycles. In addition, these polymers must have comparable glass transition temperatures (Tgs) of ±50° C. coupled with similar mechanical performance and thermo-oxidative stability. These qualifications are met in the present invention.

The thermosetting polyimides, Thermid ® LR-600, MC-600, FA-700, and IP-600 have the following formulas:

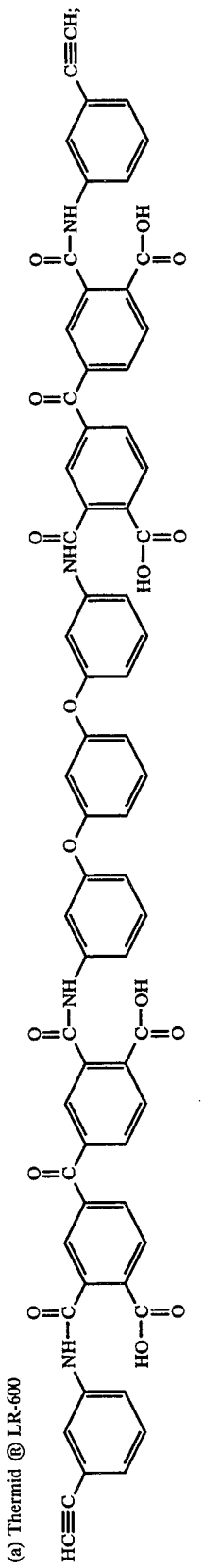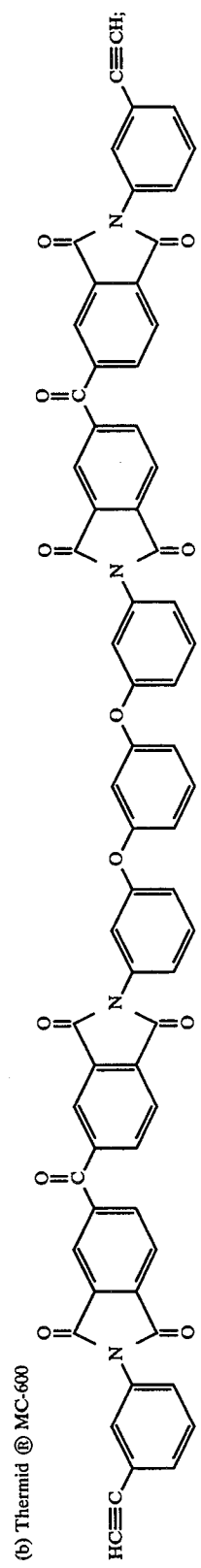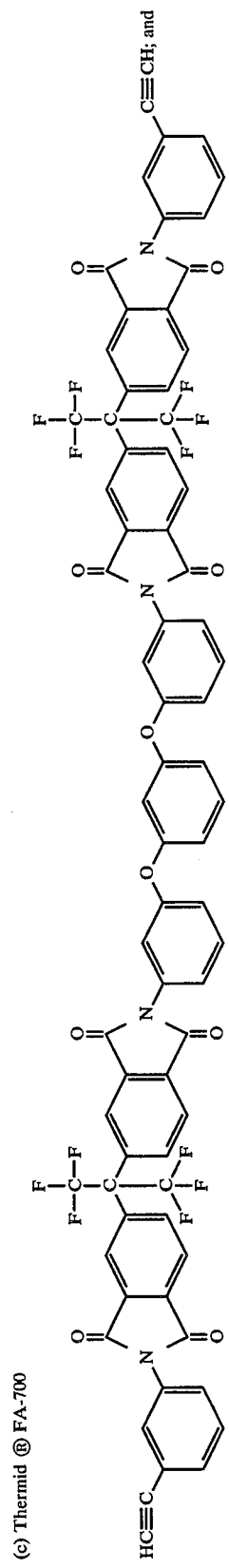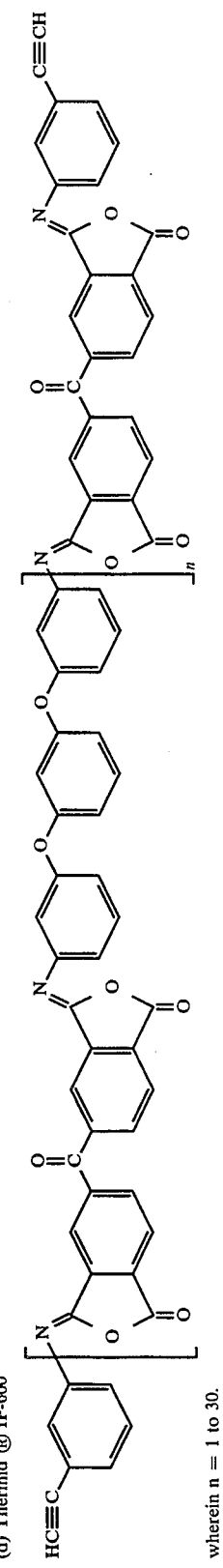
(a) Thermid ® LR-600
(b) Thermid ® MC-600
(c) Thermid ® FA-700
(d) Thermid ® IP-600
wherein n = 1 to 30.

The thermoplastic polyimide portion of the semi-IPN was prepared from a monomeric mixture of the following three compounds:

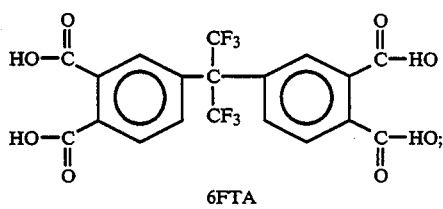

(a)

6FTA

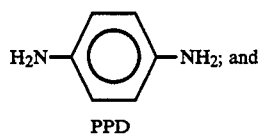

(b)

PPD

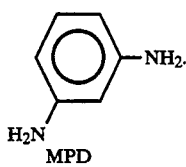

(c)

MPD

This polyimide precursor solution in N-methyl pyrrolidinone (NMP) is commercially available from Dupont under the name NR-150B2. In this solution, 6FTA is present in a stoichiometric quantity with respect to the total of PPD and MPD. The molar ratio of PPD to MPD is about 95:5. Although this mixture exists in NMP, there are other polyimide precursor solutions available from Dupont which are in ethanol. These systems are marketed under the trademarks NR-150B2 S2X to NR-150B2 S10X. When polymerized, this thermoplastic polyimide contains the following repeat unit:

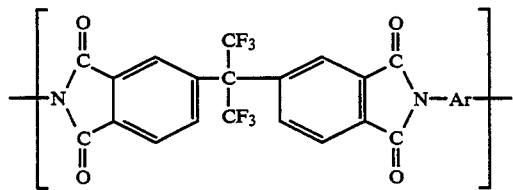

where Ar = 

The composition of these materials significantly affects many aspects of the processing, properties, and morphology of the semi-IPN. For example, by increasing the concentration of the thermosetting component, there is an increase in the processability and performance of the semi-IPN but a decrease in the toughness characteristics. Although the weight ratio of the thermoset to the thermoplastic can be varied from 95:5 to 5:95, the ratio between 80:20 and 20:80 is preferred. The ratio of 80:20 gave the best overall balance of processing, performance, and cost effectiveness.

The semi-IPN of the present invention exhibits significantly improved processability over the prior art. The curing reaction of the prior art involves two steps or stages. In the first stage, there is a very rapid free-radical initiated addition reaction through the acetylene-terminated group leading to a linear polyene structure. This reaction takes place at a relatively low temperature (200° to 250° C.). The second stage involves a very slow crosslinking reaction of the conjugated double bond in the polyene to yield a highly crosslinked structure. This reaction occurs at a very high temperature (e.g. 371° C.). The present invention designed a reaction system to achieve that the reaction rate for the first stage was decreased and the second stage was accelerated. A retarded stage one reaction broadens the processing window and allows the volatiles to escape. Also, increasing the rate of stage two increases the degree of crosslinking and, thus, improves the elevated temperature mechanical properties.

These objectives were achieved through a change in the flow properties of the prior art. This was made possible by the presence of a thermoplastic component, that exhibited poor flow in the low temperature region and good flow in the high temperature range. Thus, its presence decreases the flow, slows down the reaction rate and broadens the processing window of the prior art, during the low temperature curing stage. Also, in the high temperature region, its presence increases the flow, molecular mobilities and rate of the crosslinking reaction. This provides a high temperature system having both improved processability and thermal mechanical performance, compared to the unmodified prior art. Furthermore, if the thermoplastic used has good toughness, its presence also enhances the toughness related properties, including fracture toughness, impact resistance, and microcrack resistance.

In the present invention, the simultaneous synthetic method is preferred, because it offers easier processing, better performance, and less phase separation, as compared to the sequential approach. An uncrosslinked preimidized oligomer is crosslinked with a monomer precursor of NR-150B2. The constituent thermosetting and thermoplastic polymers are formed independently without any chemical interference between the precursors of the two polymer components.

The semi-IPN polyimide of this invention is useful as a composite matrix, and as an adhesive and molding compound for long-term applications in the range from 200° C. to 316° C. as in aerospace structural components and especially in electronic technologies.

The following are examples which illustrate the preparation and use of semi-IPNs for applications such as advanced composites, structural adhesives, and molding articles. These examples are merely illustrative and intended to enable those skilled in the art to practice the invention in all of the embodiments flowing therefrom, and do not in any way limit the scope of the invention as defined in the claims.

EXAMPLES

Example 1

Rheological Characterization

The following is the procedure used to determine the rheological properties of the semi-IPN systems and their constituent materials. A sample powder was prepared by precipitation into water in a high speed blender. The solids were collected, washed with water, and dried at room temperature for one week. No heat treatment was given to the dried powder prior to the rheological measurements. This was done to study their thermal transitions in the low temperature region. For solid materials, such as Thermid ® IP-600, Thermid ® MC-600, and Thermid ® FA-700, the commercial products were used as received. Rheological measurements were performed on a Rheometrics ® System 4 rotary rheometer equipped with a parallel plate test fixture. A sample disc of 2.50 cm in diameter was prepared by molding approximately 0.7 g of material at room temperature under a pressure of 5,000 psi. The resulting sample disc was approximately 1.5 mm in thickness. The sample discs were always stored inside the decicator before use. During measurement, the plates and the test sample were enclosed in a heated chamber purged with dry nitrogen. In the isothermal experiment, the test chamber was always pre-warmed to the test temperature before loading the sample. In the dynamic experiment, the test chamber was pre-warmed to 110° C., followed by temperature scans from 110° C. to 450° C. at a rate of 2° C./min. In both cases, the initial (first) measurement was taken after the sample was subjected to oscillatory shear under the initial test temperature for approximately three minutes. In addition to a dynamic run, isothermal measurements were also made at 135° C., 200° C., and 250° C., respectively.

A dynamic motor was used to drive the upper plate to oscillate continuously at a fixed frequency of 10 rad/sec. The bottom plate, which remained stationary during the measurement, was attached to a torque transducer which recorded forces. The strain (oscillatory amplitude) level was adjusted manually in accordance with the changing stiffness of the reactive resin system during measurement. The levels of strain were selected to assure that the measurements were performed within the material's linear viscoelastic response range and, at the same time, adequate torque values were generated without slippage. Each experiment was repeated at least twice to ensure its reproducability. The recorded cyclic torque values were separated into in-phase and out-of-phase components, and the corresponding storage (G') and loss (G'') moduli and the tan δ values were calculated by the Rheometrics ® Data Acquisition and Analysis package.

Figure 2:
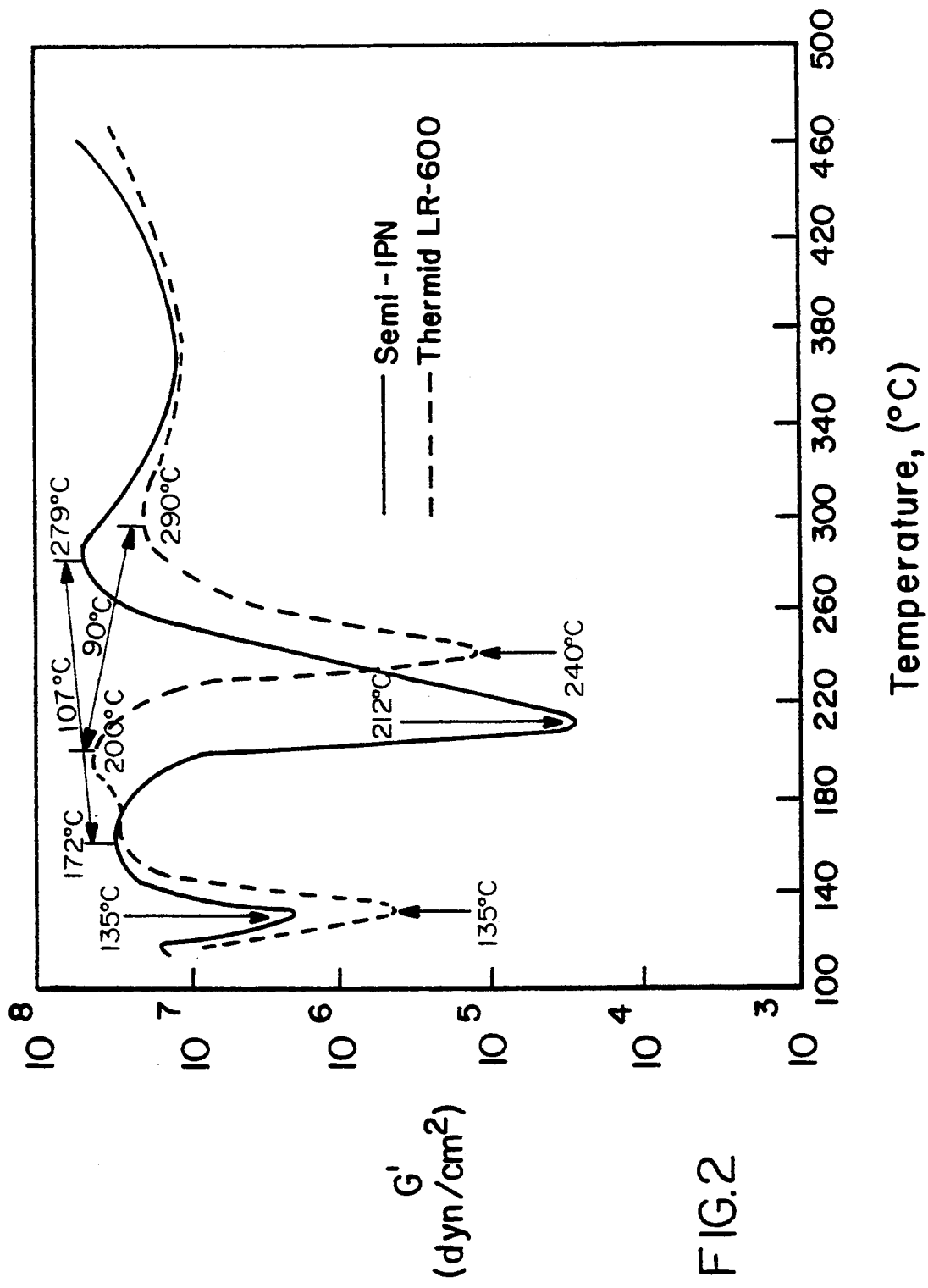
FIG. 2 shows the storage modulus (G') temperature curves for the semi-IPN of the present invention and the constituent material, Thermid ® LR-600.
Figure 3:
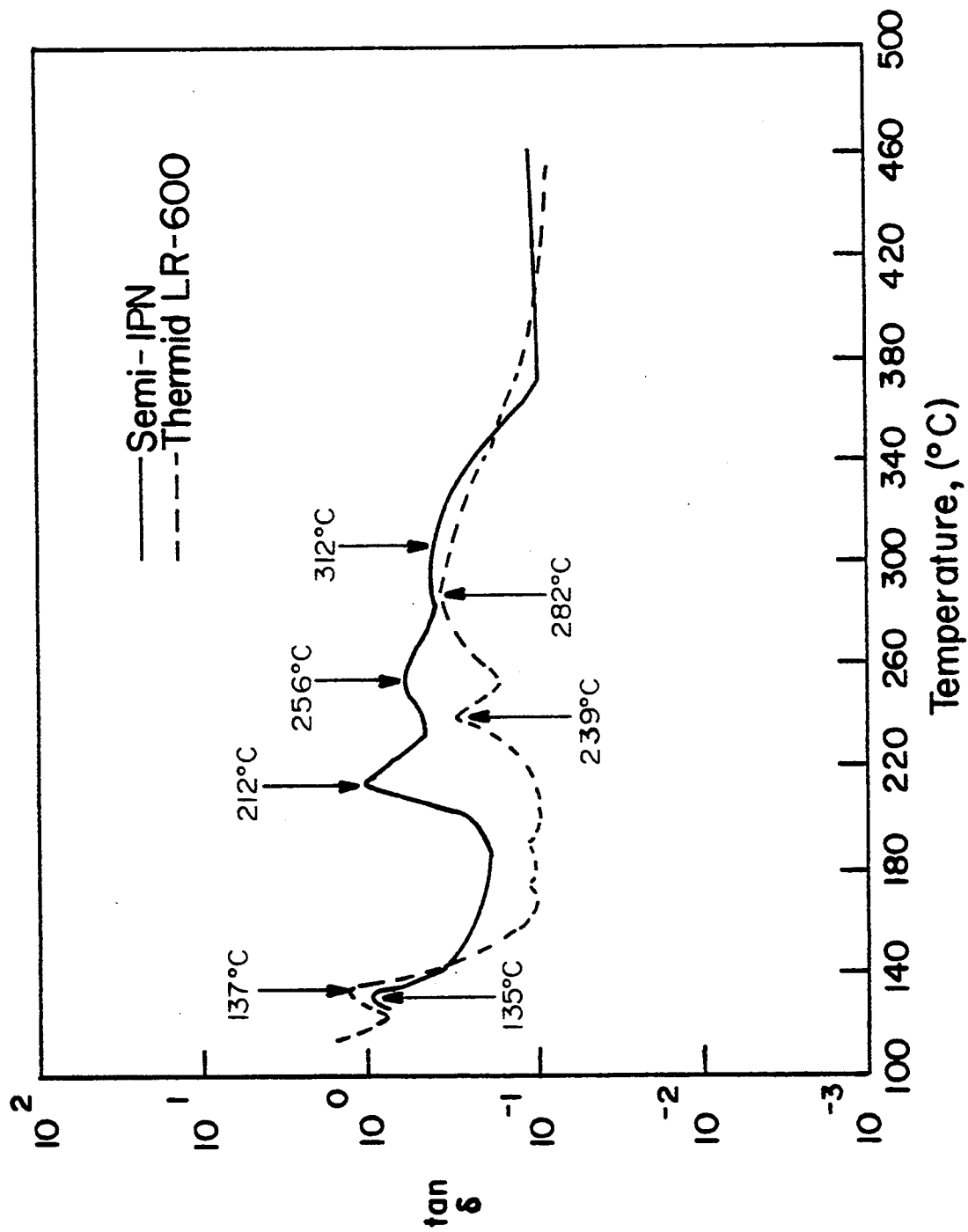
FIG. 3 shows Tan$\delta$ temperature curves for the same materials as FIG. 2.

FIG. 2 shows the storage modulus (G') temperature curve for the semi-IPN of Thermid ® LR-600 and NR-150B2 compared with the constituent material, Thermid ® LR-600. FIG. 3 displays the tan δ temperature curves for these materials.

Example 2

Preparation of Semi-IPN of Thermid ® LR-600 and NR-150B2

This semi-IPN was prepared by the simultaneous synthetic method generally described previously. In this synthesis, an acetylene-terminated polyimide crosslinks in the immediate presence of an NR-150B2 polyimide undergoing simultaneous linear chain extension to afford a simultaneous semi-IPN. It is possible that a transimidization reaction occurs between the amic acid of the Thermid ® system and the monomer precursors of the NR-150B2 material. This would result in a material somewhat similar to the material prepared in Example 3 but different from that made in Example 4. Thus, it is of interest to compare their properties.

To 104.0 g of a Thermid ® LR-600 solution (50 percent by weight of an amic acid in NMP) was added 27.0 g of an NR-150B2 monomer precursor solution (48 percent solid content in NMP) and 45.0 g of freshly distilled NMP. This mixture was stirred at room temperature for one hour, resulting in a viscous dark brown solution containing about 37 weight percent solids in which the Thermid ® LR-600 amic acid and NR-150B2 monomeric materials were present in 80 and 20 weight percent, respectively.

For a molding application, the solution was poured into distilled water and blended using a mechanical blender. The precipitated solids were filtered, dried at 100° C. for two hours under vacuum and staged at 204° C. for one-half hours to afford a black molding powder. About 15.61 g of the molding powder was compression molded at 250° C. for one hour and at 316° C. for another hour under 2500 psi pressure, and then removed from the press when the mold temperature reached 177° C. This gave a neat resin having dimensions of 3.2 cm by 3.2 cm by 1.0 cm and a density of 1.34 g/cc. The surfaces of the neat resin showed no voids, cracks or defects, and thus it was accepted for compact tension specimen preparation without further post curing. However, for other test specimen preparations, the resin was post-cured at 316° C. for 16 hours in air. In order to compare properties, the neat resins of the constituent materials, namely Thermid ® LR-600 and NR-150B2, were also prepared and tested along with the semi-IPN material under identical conditions, except that the NR-150B2 specimen had an additional curing at 350° C. for one-half hour. Table 1 summarizes the neat resin properties of the semi-IPN, compared with the constituent materials.

TABLE 1

Neat Resin Properties of Semi-IPN of Thermid ® LR-600 and NR-150B2 as Compared with the Constituent Materials

| Property | Semi-IPN | Thermid ® LR-600 | NR-150B2 |
|---|---|---|---|
| [a]Glass Transition Temperature, °C. | 278 325 | 290 | 352 |
| [b]Fracture Energy, $G_{Ic}$ J/m$^2$ | 283 | 93 | 2555 |
| [c]Temperature at 5% weight loss by TGA in Air | 465 | 460 | 515 |
| [d]Moisture Absorption, % | 0.4 | 0.3 | 0.6 |

[a]By TMA
[b]Per ASTM E399
[c]At a heating rate of 2.5° C./min
[d]Two weeks in water at room temperture

Example 3

Preparation of Semi-IPN of Thermid ® MC-600 and NR-150B2

This synthesis follows a conventional simultaneous method in which the transimidization reaction described in Example 2 is unlikely to occur, because a fully preimidized prepolymer is used in this synthesis, rather than an amic acid as used in Example 2.

To a solution of 12.3 g of the NR-150B2, was added a mixture of 30.0 g of Thermid ® MC-600 yellow powder in 60 ml of freshly distilled NMP. Because the Thermid ® MC-600 powder was not readily soluble in NMP at room temperature, the mixture was warmed and stirred at 50° C. for one hour, resulting in a highly viscous gray material. It appeared that there were some insoluble materials present in the solution; and the solution was difficult to stir using a stirring bar, because of its high viscosity. Such a viscous material was concentrated at 176° C. for two hours under vacuum (30 in Hg). To reduce its flow and to eliminate the residual solvents, the material was further treated at 200° C. for one-half hour under vacuum (30 in Hg). Approximately 14.5 g of the gray molding powder was used to prepare a molding following the cure cycle of Example 2. This afforded a neat resin with a density of 1.37 g/cc. No voids or defects were seen on the surfaces of this neat resin, the properties of which are shown in Table 2.

TABLE 2

Neat Resin Properties of Semi-IPN of Thermid ® MC-600 and NR-150B2

| Property | |
|---|---|
| [a]Glass Transition Temperature, °C. | 329 |
| [b]Fracture Energy, $G_{1c}$, J/m$^2$ | 481 |
| [c]Temperature at 5% wt loss by TGA in Air | 490 |
| [d]Moisture Absorption, % | — |

[a]By DSC
See Table 1 for all other footnotes.

Example 4

Preparation of Semi-IPN of Thermid ® FA-700 and NR-150B2

A 20 weight percent resin solution in NMP was prepared by stirring at room temperature a mixture of 52.0 g of Thermid ® FA-700 powder, 27.1 g of the NR-150B2 solution described in Example 2, and 264.0 g of freshly distilled NMP. As in Example 3, the resin solution was concentrated to afford a molding powder which was subsequently compression molded. This formed a neat resin with a density of 1.32 g/cc. Other properties of this resin are presented in Table 3.

TABLE 3

Neat Resin Properties of Semi-IPN of Thermid ® FA-700 and NR-150B2

| Property | |
|---|---|
| [a]Glass Transition Temperature, °C. | 335 |
| [b]Fracture Energy, $G_{1c}$, J/m$^2$ | 306 |
| [c]Temperature at 5% wt loss by TGA in Air | 522 |
| [d]Moisture Absorption, % | — |

See Table 2 for all footnotes.

Example 5

Preparation of Celion ® 6000/Semi-IPN of Thermid ® LR-600 and NR-150B2

For advanced composite applications, the resin solution from Example 2 was used to prepare a prepreg tape by passing a single tow of unsized Celion ® 6000 graphite fiber (available from BASF A.G.) through a dip tank and onto a 12-inch diameter multiple speed drum winder wrapped with release paper. This produced a 23.0 cm by 190 cm wet prepreg having a smooth and good tack and drape characteristics. The tape was dried on the rotating drum at room temperature for 16 hours, and then removed from the drum and cut into 7.6 cm by 15.2 cm plies. Twelve plies were tacked unidirectionally and staged at 150° C. for one hour. The staged lay-up was placed in a cold matched metal die. This was then inserted into a press preheated to 250° C. A thermocouple was attached to the matched die to determine the temperature. When the die temperature reached 250 C, 500 psi pressure was applied. The composite was cured one hour at 250° C. and one hour at 316° C. under 500 psi pressure, and then removed from the press when the die temperature reached 177° C. The composite was then postcured at 316° C. in air for 16 hours. The ultrasonic C-scan of the composite showed no detectable voids or defects, and thus it was submitted for test specimen preparations. As a control, a Celion ® 6000/Thermid ® LR-600 composite system was also prepared and tested under the identical conditions for the semi-IPN material described above.

The cured control material, however, showed considerable voids detected by the ultrasonic C-scan method. Only the area showing relatively fewer voids was used for test speciment preparation.

Table 4 shows the composite properties for the semi-IPN as well as the control materials.

TABLE 4

| | Unidirectional Composite Properties | | | | |
|---|---|---|---|---|---|
| Property | Semi-IPN[d] Thermid ® LR-600 and NR-150B2 | Thermid ® AL-600[d] | Thermid ® LR-600[d] | Thermid ® MC-600[f] | Thermid ® IP-600[g] |
| [a]Glass Transition Temperature, °C. | 312 | — | — | — | — |
| Density, g/cm$^3$ | 1.54 | 1.50 | 1.50 | — | — |
| [b]Flexural Strength, Ksi | | | | | |
| 25° C. | 254 | — | — | 195 | 130 |
| 232° C. | — | — | — | 148[e] | 78[h] |
| [b]Flexural Modulus, Msi | | | | | |
| 25° C. | 16.2 | — | — | 15.0 | — |
| 232° C. | — | — | — | 12.0[e] | — |
| [c]Interlaminar Shear Strength, Ksi | | | | | |
| 25° C. | 7.3 | 9.6 | 9.6 | 12.1 | 7.3 |
| 232° C. | — | 4.5[e] | — | 8.0[e] | 5.0[h] |

[a]By TMA
[b]Per ASTM D790
[c]Per ASTM D2344
[d]Reinforced with Celion ® 6000 graphite fibers
[e]Tested at 316° C.
[f]Reported by the National Starch and Chemical Corporation Product Data Sheet number 26283, reinforced with Hercules HTS ® graphite fibers, postcured for 4 hours at 343° C., and then 4 hours at 371° C.
[g]Reported by Landis and Naselow NASA Conference Publication 2385 (1983)
[h]Tested at 288° C.

Example 6

Preparation of Celion® 6000/Semi-IPN of Thermid® MC-600 and NR-150B2

As in Example 5, the resin solution (21 percent by weight of solids in NMP) from Example 3 was used to yield a prepreg having an area of 23 cm by 190 cm. During the drying process described in Example 5, this prepreg disunited into many pieces. Each piece had a width of about 0.6 cm. This made the composite lay-up difficult. Despite this difficulty, a high quality composite (7.6 cm by 15.2 cm by 0.2 cm) was obtained following the cure cycle of Example 5.

The physical and mechanical properties for this composite are listed in Table 5.

TABLE 5

Unidirectional Composite Properties of Semi-IPN of Thermid® MC-600 and NR-150B2

| Property | |
|---|---|
| [a]Glass Transition Temperature, °C. | 310 |
| Density, g/cm$^3$ | 1.57 |
| [b]Flexural Strength, Ksi | |
| 25° C. | 293 |
| 232° C. | 215.5 |
| [b]Flexural Modulus, Msi | |
| 25° C. | 15.8 |
| 232° C. | 15.9 |
| [c]Interlaminar Shear Strength, Ksi | |
| 25° C. | 18.5 |
| 232° C. | 10.4 |

See Table 4 for all footnotes.

Example 7

Preparation of Cross-Ply Composites

To make a realistic assessment of composite microcracking behavior, a cross-ply composite having a [0,90,0]s lay-up was fabricated for the semi-IPN of Thermid® LR-600 and NR-150B2 and Thermid® LR-600 as a control. The fabrication of the cross-ply composites follows the same procedure as their unidirectional counterparts described in Example 5. Here, AS-4 graphite fibers (which are commercially available) were used, instead of Celion® 6000 graphite fibers which were used for the unidirectional composites. Specimens (1.5 cm by 0.6 cm by 0.13 cm) were machined from the cross-ply composites and were subjected to thermal cycling. The temperature was varied from −156° to 288° C. with a total time of 15 minutes for each cycle. Liquid nitrogen was used as a cooling agent. After 1000 and 1500 thermal cycles, the unpolished surfaces were examined by scanning electron microscopy (SEM) at 100 and 2000X magnifications. Also, the specimens were immersed in water at room temperature for 1 year to determine the amount of water penetrated into the cracks and absorbed by the matrix. Table 6 shows the results of the microcracking study.

TABLE 6

Microcracking Behavior of Semi-IPN Cross-Ply Composite Compared with Constituent Material After 1500 Thermal Cycles[a]

| Property | Semi-IPN of[b] Thermid® LR-600 and NR-150B2 | Thermid® LR-600[b] |
|---|---|---|
| Type of Microcracks[c] | Mostly Longitudinal | Both Transverse and Longitudinal Microcracks |
| Type of Microcrack Failure[d] | At the Interface Between Fiber and Matrix as well as in the Matrix | Only at the Fiber-Matrix Interface |
| Moisture Absorption, %[e] | | |
| As Fabricated | 1.3 | 1.8 |
| After 1500 Thermal Cycles | 1.8 | 3.3 |

[a]Temperature varied from −156 to 288° C.;
[b]Reinforced with AS-4 graphite fibers and has [0,90,0]s layup;
[c]By SEM at 100× magnification;
[d]By SEM at 2000× magnification;
[e]One year in water at 25° C.

What is claimed as new and desired to be secured by Letters Patent of the United States is:

1. A process for preparing a tough, processable semi-interpenetrating polymer network, which process comprises:
   (a) mixing an uncrosslinked, acetylene-terminated thermosetting polyimide prepolymer with monomer precursors of a thermoplastic polyimide at a weight ratio from about 95:5 to 5:95 to form a mixture;
   (b) allowing the mixture to react below 300° C., whereby flow of the thermosetting polyimide prepolymer is decreased by the presence of the monomer precursors of the thermoplastic polyimide to form a mixture containing a thermosetting polyimide and a thermoplastic polyimide; and
   (c) heating the mixture containing the thermosetting polyimide and the thermoplastic polyimide above 300° C., whereby flow of the thermosetting polyimide is increased resulting in a tough, processable semi-interpenetrating polymer network.

2. The process for preparing a tough, processable semi-interpenetrating polymer network of claim 1, wherein the monomer precursors of a thermoplastic polyimide comprise a mixture of the following three compounds:

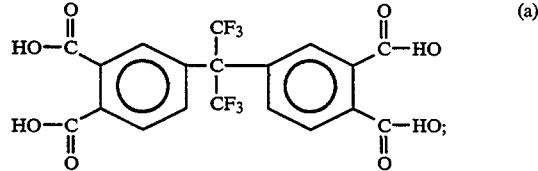

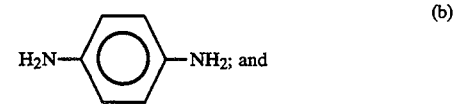

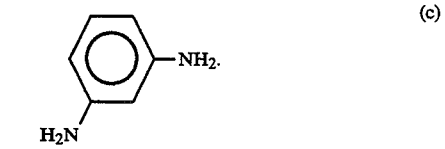

3. The process for preparing a tough, processable semi-interpenetrating polymer network of claim 2, wherein compound (a) is present in a stoichiometric quantity with respect to the total of compound (b) and compound (c), and the molar ratio of compound (b):compound (c) is about 95:5.

4. The process for preparing a tough, processable semi-interpenetrating polymer network of claim 2, wherein the monomer precursors of the thermoplastic polyimide form a polyimide having the following repeat unit:

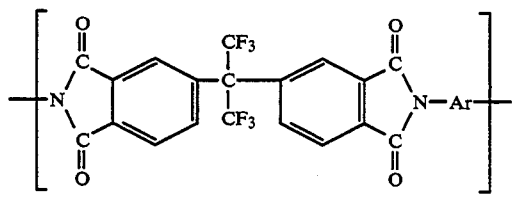

where Ar is

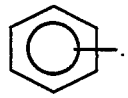

5. The process for preparing a tough, processable semi-interpenetrating polymer network of claim 1, wherein the uncrosslinked, acetylene-terminated thermosetting polyimide prepolymer is prepared from the following amic acid:

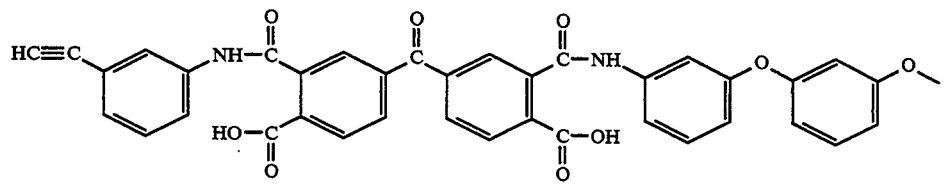

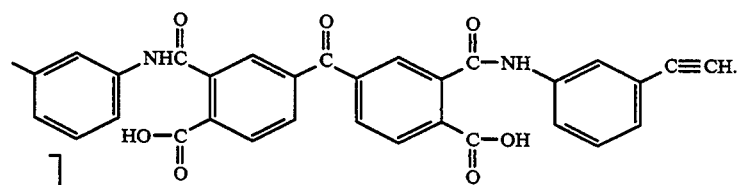

6. The process for preparing a tough, processable semi-interpenetrating polymer network of claim 1, wherein the uncrosslinked, acetylene-terminated thermosetting polyimide prepolymer is derived from the following imide prepolymer:

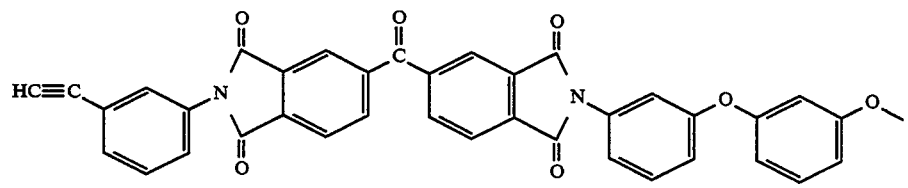

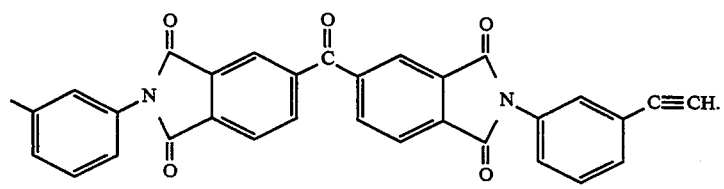

7. The process for preparing a tough, processable semi-interpenetrating polymer network of claim 1, wherein the thermosetting polyimide is prepared from the following imide prepolymer which contains a hexafluorisopropylidene linking group:

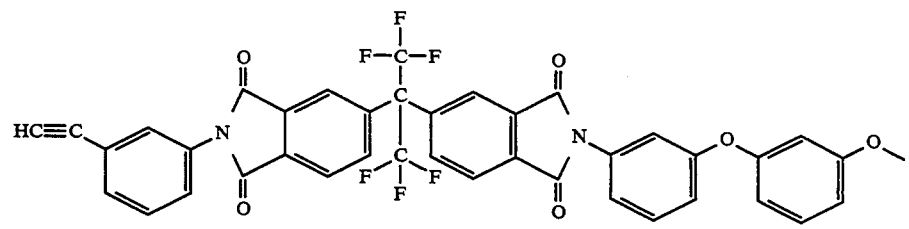

-continued

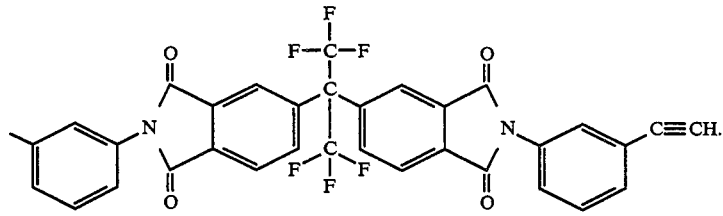

8. The process for preparing a tough, processable semi-interpenetrating polymer network of claim 1, wherein the acetylene-terminated thermosetting polyimide prepolymer and the monomer precursors of a thermoplastic polyimide are present in a weight ratio from about 80:20 to 20:80.

9. The process for preparing a tough, processable semi-interpenetrating polymer network of claim 1, wherein the uncrosslinked, acetylene-terminated thermosetting polyimide prepolymer has the following formula:

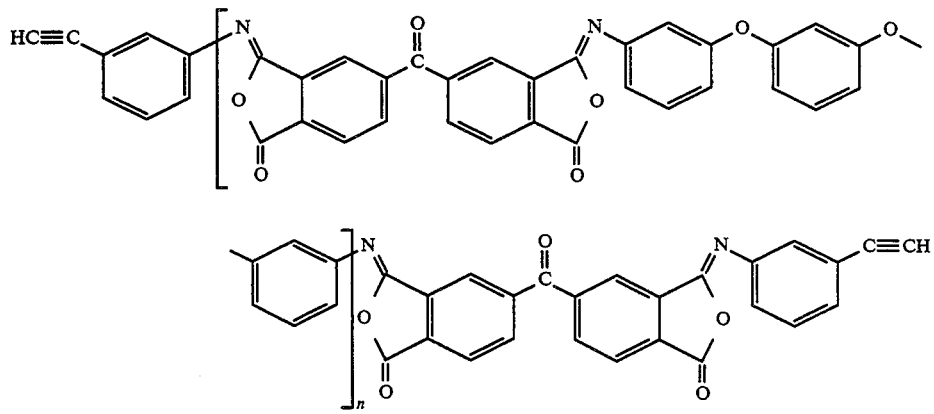

wherein n=1 to 30.

* * * * *